(12) United States Patent  (10) Patent No.: US 8,040,841 B2
Ono  (45) Date of Patent: Oct. 18, 2011

(54) WIRELESS COMMUNICATION SYSTEM, WIRELESS TERMINAL AND WIRELESS BASE STATION

(75) Inventor: Tomohiro Ono, Minato-ku (JP)

(73) Assignee: NEC Corporation, Tokyo (JP)

( * ) Notice: Subject to any disclaimer, the term of this patent is extended or adjusted under 35 U.S.C. 154(b) by 703 days.

(21) Appl. No.: 12/182,508

(22) Filed: Jul. 30, 2008

(65) Prior Publication Data

US 2009/0034497 A1  Feb. 5, 2009

(30) Foreign Application Priority Data

Jul. 30, 2007  (JP) ................................. 2007-197513

(51) Int. Cl.
*H04W 4/00* (2009.01)
(52) U.S. Cl. ........................................ 370/328; 370/338
(58) Field of Classification Search ........................ None
See application file for complete search history.

(56) References Cited

U.S. PATENT DOCUMENTS

| 7,778,153 B2 * | 8/2010 | Choi et al. ..................... 370/210 |
| 2006/0206597 A1 * | 9/2006 | Kim et al. ..................... 709/220 |
| 2007/0232339 A1 * | 10/2007 | Ji et al. ............................. 455/502 |
| 2007/0298761 A1 * | 12/2007 | Bani Hani ................... 455/404.2 |
| 2008/0239938 A1 * | 10/2008 | Jalloul et al. ..................... 370/201 |
| 2008/0285500 A1 * | 11/2008 | Zhang et al. ..................... 370/315 |
| 2009/0073916 A1 * | 3/2009 | Zhang et al. ..................... 370/315 |

FOREIGN PATENT DOCUMENTS

| JP | 08-274758 A | 10/1996 |
| JP | 2002-112347 A | 4/2002 |
| JP | 2003-153238 A | 5/2003 |
| JP | 2004-506382 A | 2/2004 |
| JP | 2004-128563 A | 4/2004 |
| JP | 2005-130487 A | 5/2005 |
| JP | 2005-184820 A | 7/2005 |
| JP | 2005-532759 A | 10/2005 |
| JP | 2006-196985 A | 7/2006 |
| WO | 2004/008693 A | 1/2004 |
| WO | 2007/038781 A1 | 4/2007 |

* cited by examiner

*Primary Examiner* — Min Jung
(74) *Attorney, Agent, or Firm* — Sughrue Mion, PLLC (57) ABSTRACT

If a WiMAX base station cannot receive a ranging signal from a WiMAX-embedded wireless terminal or if adjustment is not completed even after the WiMAX-embedded wireless terminal adjusts a parameter depending on adjusted value information for a pre-determined number of times, negotiation is performed via a heterogeneous network to establish a communication connection for upstream communication from the WiMAX-embedded wireless terminal to the WiMAX base station, and only downstream communication from the WiMAX base station to the WiMAX-embedded wireless terminal is performed via a WiMAX network.

25 Claims, 7 Drawing Sheets

Fig. 1

RELATED ART

Fig. 2

RELATED ART

Fig. 11

WIRELESS COMMUNICATION SYSTEM, WIRELESS TERMINAL AND WIRELESS BASE STATION This application is based upon and claims the benefit of priority from Japanese Patent Application No. 2007-197513 filed in Japan Patent Office on Jul. 30, 2007, the contents of which are hereby incorporated by reference.

BACKGROUND OF THE INVENTION

1. Field of the Invention

The present invention relates to a wireless communication system, and more particularly, to a WiMAX (Worldwide Interoperability for Microwave Access) [IEEE 802.16a] system, and a wireless terminal and a wireless base station used for the system. WiMAX® is one of standards of radio communication technology, and is a generic term for technology that is standardized by the IEEE 802.16 working group and the WiMAX Forum® which is an industry organization.

2. Description of the Related Art

In a current WiMAX system, a communication area is smaller in Up Link communication than in Down Link communication. This is caused by problems of asymmetry of transmission powers or transmission and reception timing between a WiMAX base station and a WiMAX-embedded wireless terminal.

Figure 1:
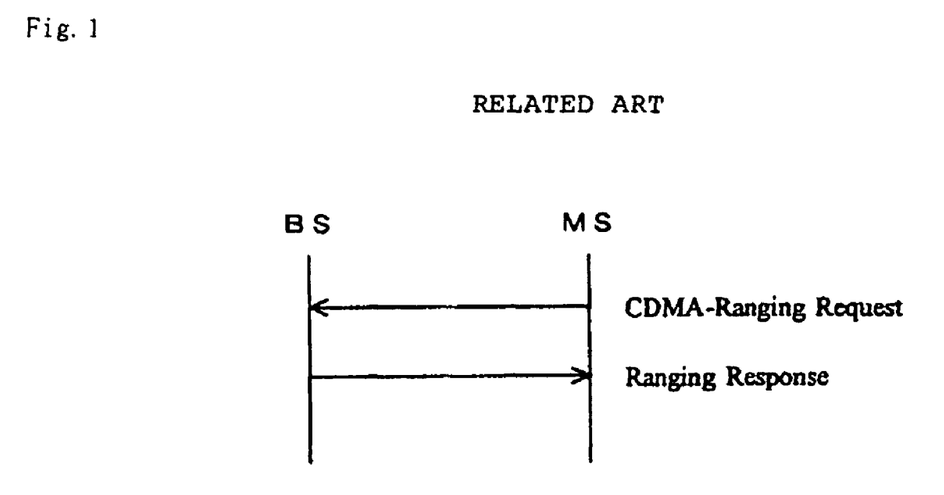
FIG. 1 is a diagram showing a sequence of a Ranging Request by a WiMAX-embedded wireless terminal and a response to the request by a WiMAX base station.

As shown in FIG. 1, a WiMAX base station (BS) receives a CDMA Ranging Request from a WiMAX-embedded wireless terminal (MS), and notifies WiMAX-embedded wireless terminal 4 of respective adjusted values of power, timing and frequency in a Ranging Response. When the respective parameters of power, timing and frequency are values within permissible ranges, the WiMAX base station notifies the WiMAX-embedded wireless terminal of Ranging completion in a Ranging Response.

Until the WiMAX-embedded wireless terminal is notified of the Ranging completion by the WiMAX base station, the terminal repeats transmission of a CDMA Ranging Request to the WiMAX base station for a prescribed number of times by referring to adjusted values notified in the Ranging Response by the WiMAX base station. In this manner, the terminal adjusts the respective parameters of power, timing and frequency. However, the WiMAX base station cannot notify the WiMAX-embedded wireless terminal of the Ranging completion, that is, it cannot adjust a value of any of the parameters even by adjusting prescribed number of times. If the parameters cannot be adjusted, Network Entry fails, so that the WiMAX-embedded wireless terminal cannot get service in Down Link or Up Link.

One cause why respective parameters cannot be adjusted to be within permissible ranges in a CDMA Ranging Request by a prescribed number of times includes, for example, that the transmission power of the WiMAX-embedded wireless terminal is lower than the transmission power of the WiMAX base station.

A WiMAX-embedded wireless terminal is often used with information equipment such as a PC, or used independently as a mobile phone terminal. In either case, the WiMAX-embedded wireless terminal needs to be operated in a power-saving mode. As such, power consumption of the WiMAX-embedded wireless terminal even when operating at maximum power is lower than that of a WiMAX base station. The WiMAX-embedded wireless terminal cannot often gain a sufficient receiving electric field in Up Link, in which the WiMAX-embedded wireless terminal is a transmitter, even in an area where in Down Link, in which the WiMAX base station is a transmitter, the WiMAX-embedded wireless terminal can receive a signal in a preferable state in which it can gain a sufficient receiving electric field.

Another cause includes the following.

In a CDMA Ranging Request, timing is adjusted in addition to the power. Accordingly, in Up Link, when a WiMAX base station receives the signals transmitted from WiMAX-embedded wireless terminals, if the respective signals are received at different times, interference is caused among Sub-channels, thereby causing a great influence on demodulation.

In Down Link, a WiMAX-embedded wireless terminal identifies the head of a Down Link Subframe in Preamble, so that a delay due to propagation causes no problem. On the other hand, in Up Link, a WiMAX base station defines the head of an Up Link Subframe by a TTG (Transmit/Receive Transition Gap) from the end of a Down Link Subframe. As such, if a delay due to propagation is too long, a WiMAX base station can not receive a CDMA Ranging Request.

To address the case in which Up Link communication is difficult or the communication quality is low, a technique is provided such as handover to a heterogeneous network such as a mobile network as disclosed in Japanese Patent Laid-Open No. 2005-184820, or amplification of a signal source by a relay as disclosed in Japanese Patent Laid-Open No. 2006-196985. However, communication by a WiMAX system for only a Down Link service has not been realized.

According to the invention disclosed in Japanese Patent Laid-Open No. 2005-184820, handover is performed to a heterogeneous network if a WiMAX Up Link service is unnecessary and only a Down Link service is necessary. Thus, if the fee for communication via the heterogeneous network is high, the user must pay a high communication fee.

The invention disclosed in Japanese Patent Laid-Open No. 2006-196985 has the problem in which there is a need to invest in equipment for installing a relay.

A technique for Down Link communication includes "Communication System" disclosed in Japanese Patent Laid-Open No. 2003-153238, or "Radio Communication System and Retransmission Control Method Thereof" disclosed in Japanese Patent Laid-Open No. 8-274758.

However, according to the inventions disclosed in Japanese Patent Laid-Open No. 2003-153238 and Japanese Patent Laid-Open No. 8-274758, a communication system for a Down Link service is not specified. Moreover, they do not assume a WiMAX system. Furthermore, the patent documents do not disclose anything about a connection method.

Further, a Down Link service is limited to a broadcast channel according to the invention disclosed in Japanese Patent Laid-Open No. 2003-153238, so that it is difficult to apply the invention to Down Link services other than the broadcast channel.

As in the above, according to the inventions disclosed in Japanese Patent Laid-Open No. 2003-153238 and Japanese Patent Laid-Open No. 8-274758, it is impossible to provide only a Down Link service by a WiMAX system.

SUMMARY OF THE INVENTION

In view of the above problems, it is an exemplary object of the present invention to provide a wireless communication system for providing only a Down Link service in an area where only Down Link communication is possible, and a wireless terminal and a wireless base station used for the system.

To achieve the above object, a wireless communication system according to an exemplary aspect of the present invention includes at least one wireless terminal and one wireless base station, the wireless terminal being connected to the wireless base station via a wireless network and a heterogeneous network which is an arbitrary communication network different from the wireless network, wherein the wireless terminal includes:

a first wireless communicator for sending out a ranging signal to the wireless base station via the wireless network to establish communication with the wireless base station; and a parameter adjuster for adjusting a communication parameter of the ranging signal depending on adjusted value information contained in a response signal received from the wireless base station via the wireless network, the wireless base station includes:

a parameter determiner for determining whether or not the communication parameter of the ranging signal received from the wireless terminal via the wireless network is within a pre-determined range; and a second wireless communicator for sending back the response signal that includes completion notification if the communication parameter of the ranging signal is within the pre-determined range, or that includes the adjusted value information if the parameter is not within the predetermined range, to the wireless terminal via the wireless network, and if the wireless base station cannot receive the ranging signal from the wireless terminal or if the adjustment is not completed even after the wireless terminal adjusts the communication parameter depending on the adjusted value information for a pre-determined number of times, negotiation is performed via the heterogeneous network to establish a communication connection for upstream communication from the wireless terminal to the wireless base station, and only downstream communication from the wireless base station to the wireless terminal is performed via the wireless network.

A wireless communication system according to an another exemplary aspect of the present invention includes at least one wireless terminal and one wireless base station, the wireless terminal being connected to the wireless base station via a wireless network and a heterogeneous network which is an arbitrary communication network different from the wireless network, wherein the wireless terminal includes:

an interface unit for communicating with the wireless base station via the heterogeneous network using a communication function of another apparatus that is connected;

a first wireless communicator for sending out a ranging signal to the wireless base station via the wireless network to establish communication with the wireless base station; and a parameter adjuster for adjusting a communication parameter of the ranging signal depending on adjusted value information contained in a response signal received from the wireless base station via the wireless network, the wireless base station includes:

a network communicator for communicating with the wireless terminal via the heterogeneous network;

a parameter determiner for determining whether or not the communication parameter of the ranging signal received from the wireless terminal via the wireless network is within a pre-determined range; and a second wireless communicator for sending back the response signal that includes completion notification if the communication parameter of the ranging signal is within the pre-determined range, or that includes the adjusted value information if the parameter is not within the pre-determined range, to the wireless terminal via the wireless network, and if the wireless base station cannot receive the ranging signal from the wireless terminal or if the adjustment is not completed even after the wireless base station adjusts the communication parameter depending on the adjusted value information for a pre-determined number of times, negotiation is performed using a communication function of the another apparatus via the heterogeneous network to establish a communication connection for upstream communication from the wireless terminal to the wireless base station, and only downstream communication from the wireless base station to the wireless terminal is performed via the wireless network.

A wireless terminal according to an exemplary aspect of the present invention, which is connected to a wireless base station via a wireless network and via a heterogeneous network which is an arbitrary communication network different from the wireless network, includes:

a wireless communicator for sending out a ranging signal to the wireless base station via the wireless network to establish communication with the wireless base station;

a parameter adjuster for adjusting a communication parameter of the ranging signal depending on adjusted value information contained in a response signal received from the wireless base station via the wireless network; and a controller for performing negotiation to establish a communication connection for upstream communication with the wireless base station via the heterogeneous network and for performing only downstream communication from the wireless base station via the wireless network, if the adjustment is not completed even after the parameter is adjusted for a pre-determined number of times depending on the adjusted value information, or if the wireless base station cannot receive the ranging signal.

A wireless base station according to an exemplary aspect of the present invention, which is connected to at least one wireless terminal via a wireless network and via a heterogeneous network which is an arbitrary communication network different from the wireless network, includes:

a parameter determiner for determining whether or not a communication parameter of a ranging signal received from the wireless terminal via the wireless network is within a pre-determined range;

a wireless communicator for sending back a response signal that includes completion notification if the communication parameter of the ranging signal is within the pre-determined range, or that includes adjusted value information if the parameter is not within the pre-determined range, to the wireless terminal via the wireless network; and a controller for performing negotiation via the heterogeneous network to establish a communication connection for upstream communication from the wireless terminal and for performing only downstream communication to the wireless terminal via the wireless network, if the wireless base station cannot receive the ranging signal from the wireless terminal, or if the adjustment is not completed even after the wireless terminal adjusts the parameter depending on the adjusted value information for a pre-determined number of times.

The above and other objects, features, and advantages of the present invention will become apparent from the following description with reference to the accompanying drawings which illustrate examples of the present invention.

DETAILED DESCRIPTION OF THE EXEMPLARY EMBODIMENTS

First Exemplary Embodiment

A first exemplary embodiment of the present invention will be described.

Figure 2:
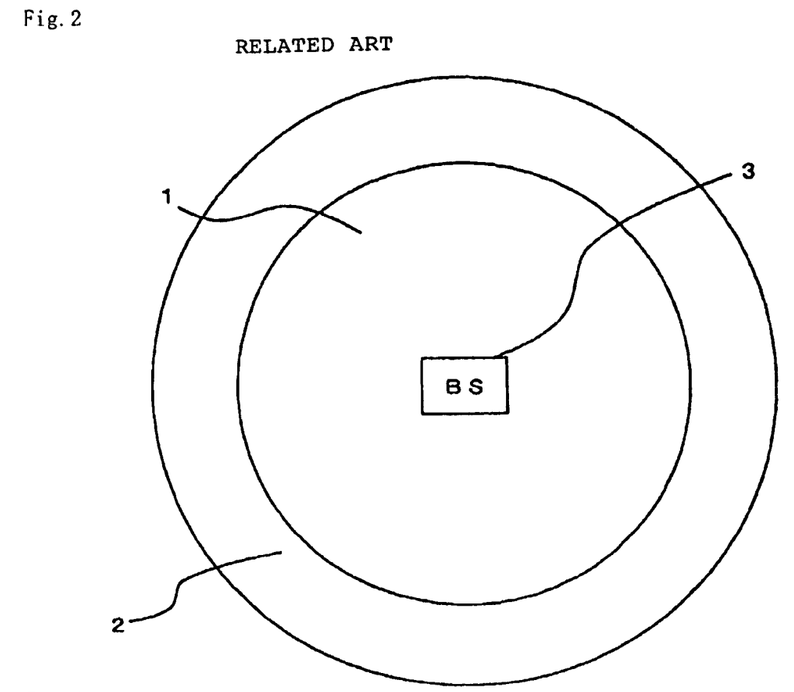
FIG. 2 is a pattern diagram showing the relation between an area where Up Link communication is possible and an area where only Down Link communication is possible.

In a WiMAX system, in the outside of area 1 where Down Link and Up Link communication are possible, there is area 2 where only Down Link communication is possible, as shown in FIG. 2. A WiMAX system according to this exemplary embodiment is to provide only a Down Link service in an area where only Down Link communication is possible so that the respective parameters of the received power and reception timing are sufficient in Down Link, but the respective parameters of the received power and reception timing are insufficient in Up Link.

Figure 3:
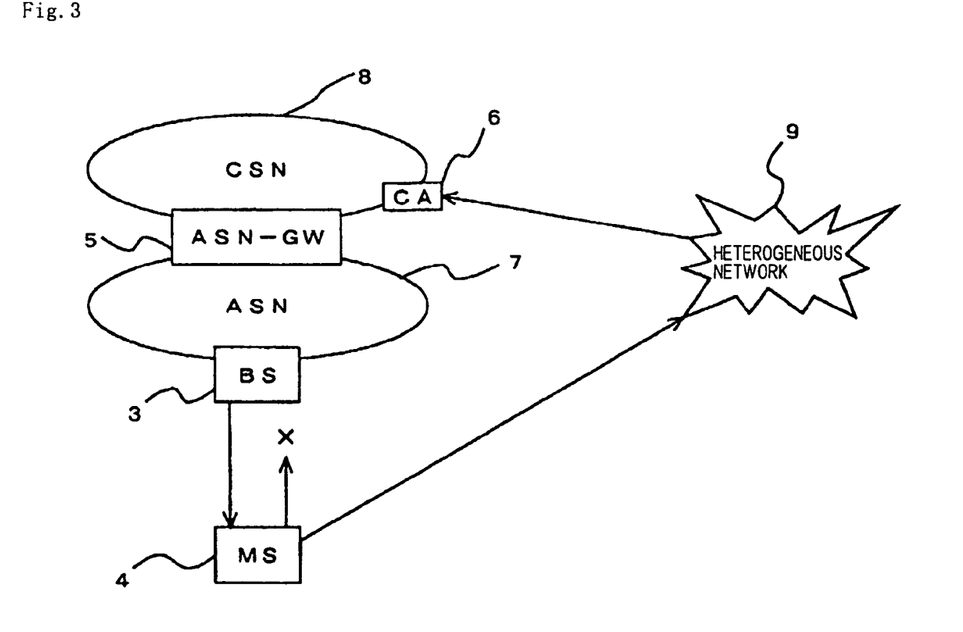
FIG. 3 is a block diagram showing the configuration of a WiMAX system according to a first exemplary embodiment of the present invention.

In area 2 where only Down Link communication is possible, if CDMA Ranging is not successful, negotiation is performed using a management message for Network Entry other than Ranging, as shown in FIG. 3. For Down Link, WiMAX base station 3 and WiMAX-embedded wireless terminal 4 directly negotiate with each other. For Up Link, WiMAX base station 3 and WiMAX-embedded wireless terminal 4 do not directly negotiate, but WiMAX base station 3 and WiMAX-embedded wireless terminal 4 negotiate with each other through heterogeneous network 9 and CA (Certificate Authority) 6 of CSN (Connectivity Service Network) 8.

Heterogeneous network 9 is a communication network such as a third generation mobile phone network, a second generation mobile phone network such as PDC (Personal Digital Cellular) or GSM (Global System for Mobile Communications), a PHS (Personal Handy-Phone System) network, a fixed telephone network, a wireless LAN (Local Area Network), or a wired LAN. A device, which is connected to the heterogeneous networks (heterogeneous network communicator 104 discussed later), and a WiMAX communication device (WiMAX communicator 103 discussed later) are mounted on WiMAX-embedded wireless terminal 4. These devices may be dual devices or multiple devices.

CA 6 is a certificate authority for certificating WiMAX-embedded wireless terminal 4 for accessing WiMAX base station 3 via heterogeneous network 9. ASN-GW (Access Service Network-Gateway) 5 connects a first network in which CA 6 being a certificate authority is installed (CSN 8) and a second network in which WiMAX base station 3 is installed (ASN 7). ASN-GW 5 can manage all WiMAX base stations 3 and can deliver the management information to each WiMAX base station 3 and to CA 6 at pre-determined intervals.

If CDMA Ranging is not completed, negotiation is performed using a management message for Network Entry other than Ranging. For Down Link, WiMAX base station 3 and WiMAX-embedded wireless terminal 4 directly negotiate with each other. For Up Link, WiMAX base station 3 and WiMAX-embedded wireless terminal 4 do not directly negotiate with each other, but WiMAX base station 3 and WiMAX-embedded wireless terminal 4 negotiate with each other through heterogeneous network 9 and CA 6 of CSN 8.

Figure 4:
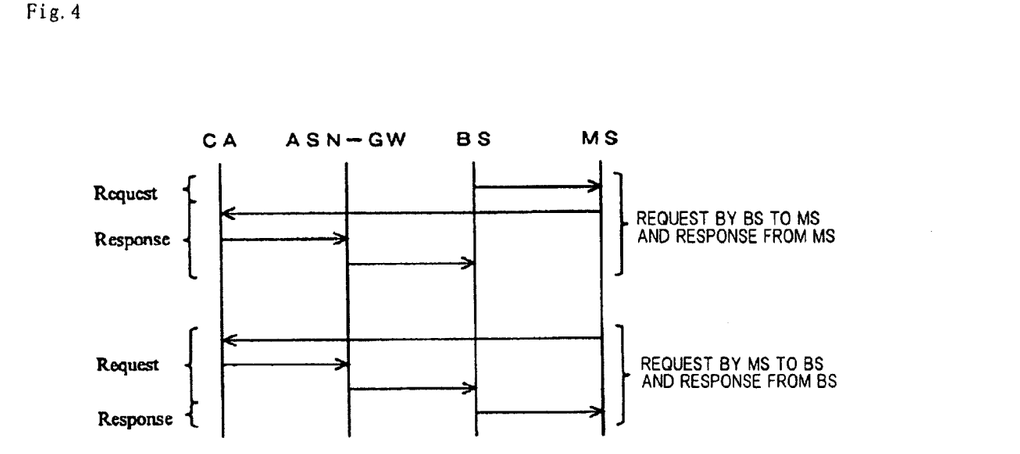
FIG. 4 is a diagram showing a sequence of Network Entry and data path generation in the WiMAX system shown in FIG. 3.

That is, if CDMA Ranging is not completed, the WiMAX system performs Network Entry and data path generation according to a sequence flow shown in FIG. 4. No completion of CDMA Ranging herein means that parameters such as power or timing cannot be adjusted within the prescribed number of times.

In the WiMAX system, a request of a management message and a response thereof are carried out by using heterogeneous network 9 for Up Link, thereby performing necessary negotiation. A management message includes all WiMAX management messages other than Ranging, such as SS Basic Capability, Registration or Privacy Key Management, for example.

Figure 5:
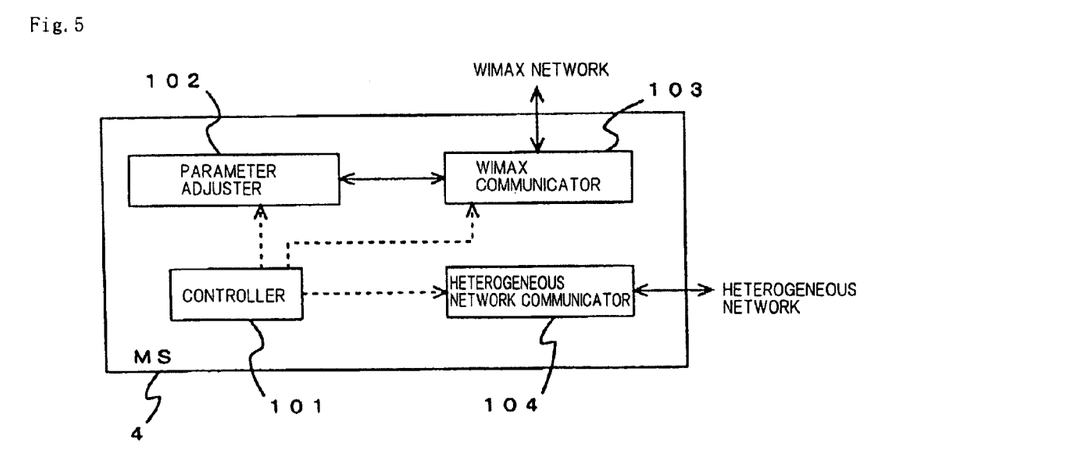
FIG. 5 is a block diagram showing the functional configuration of a WiMAX-embedded wireless terminal.

FIG. 5 shows the functional configuration of WiMAX-embedded wireless terminal 4. WiMAX-embedded wireless terminal 4 includes controller 101, parameter adjuster 102, WiMAX communicator 103 and heterogeneous network communicator 104.

Controller 101 controls operation for communication with WiMAX wireless base station 3 of WiMAX-embedded wireless terminal 4.

Parameter adjuster 102 extracts adjusted value information contained in a Ranging Response received from WiMAX wireless base station 3 via a WiMAX network, and adjusts parameters for WiMAX communication based on the extracted information.

WiMAX communicator 103 is a function unit for transmitting and receiving information via the WiMAX network. Heterogeneous network communicator 104 is a function unit for transmitting and receiving information via heterogeneous network 9. A plurality of heterogeneous network communicators 104 can be implemented for two or more communication networks.

Figure 6:
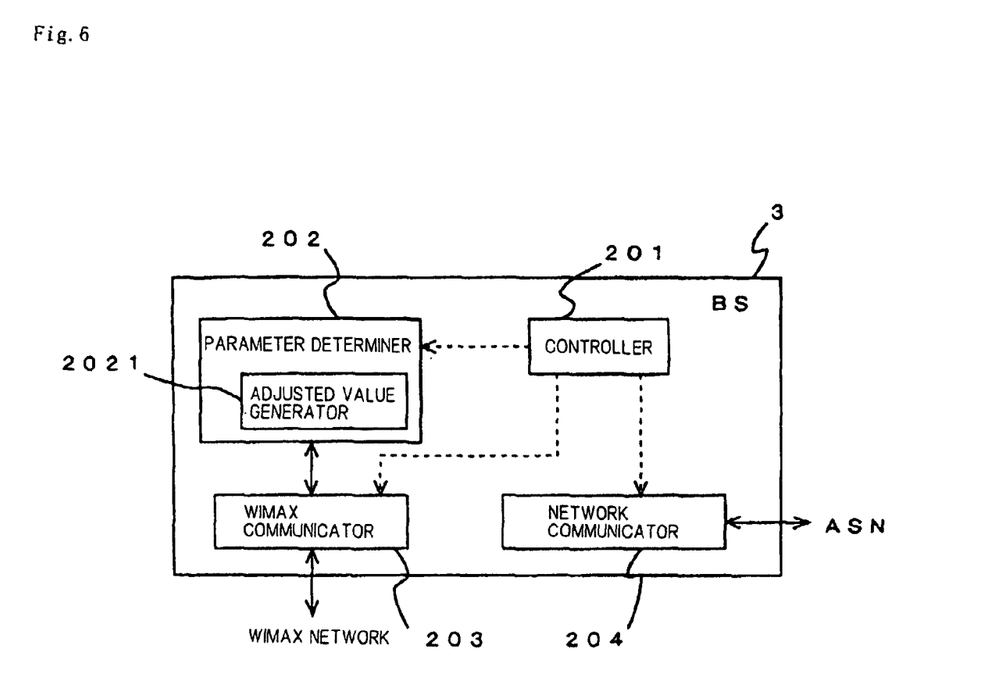
FIG. 6 is a block diagram showing the functional configuration of a WiMAX base station.

FIG. 6 shows the functional configuration of WiMAX base station 3. WiMAX wireless base station 3 includes controller 201, parameter determiner 202, adjusted value generator 2021, WiMAX communicator 203 and network communicator 204.

Controller 201 controls operation for communication with WiMAX-embedded wireless terminal 4 of WiMAX base station 3. Parameter determiner 202 analyzes a Ranging Request received from WiMAX-embedded wireless terminal 4 via the WiMAX network, and determines whether or not a parameter in a received signal is within a pre-determined range. If the parameter is not within the pre-determined range, parameter determiner 202 causes adjusted value generator 2021 to generate an adjusted value to set the parameter of the Ranging Request in the pre-determined range.

WiMAX communicator 203 is a function unit for transmitting and receiving information via the WiMAX network. Network communicator 204 is a function unit for transmitting and receiving information via ASN (Access Service Network) 7.

The operation of the WiMAX system according to this exemplary embodiment will be described.

Figure 7:
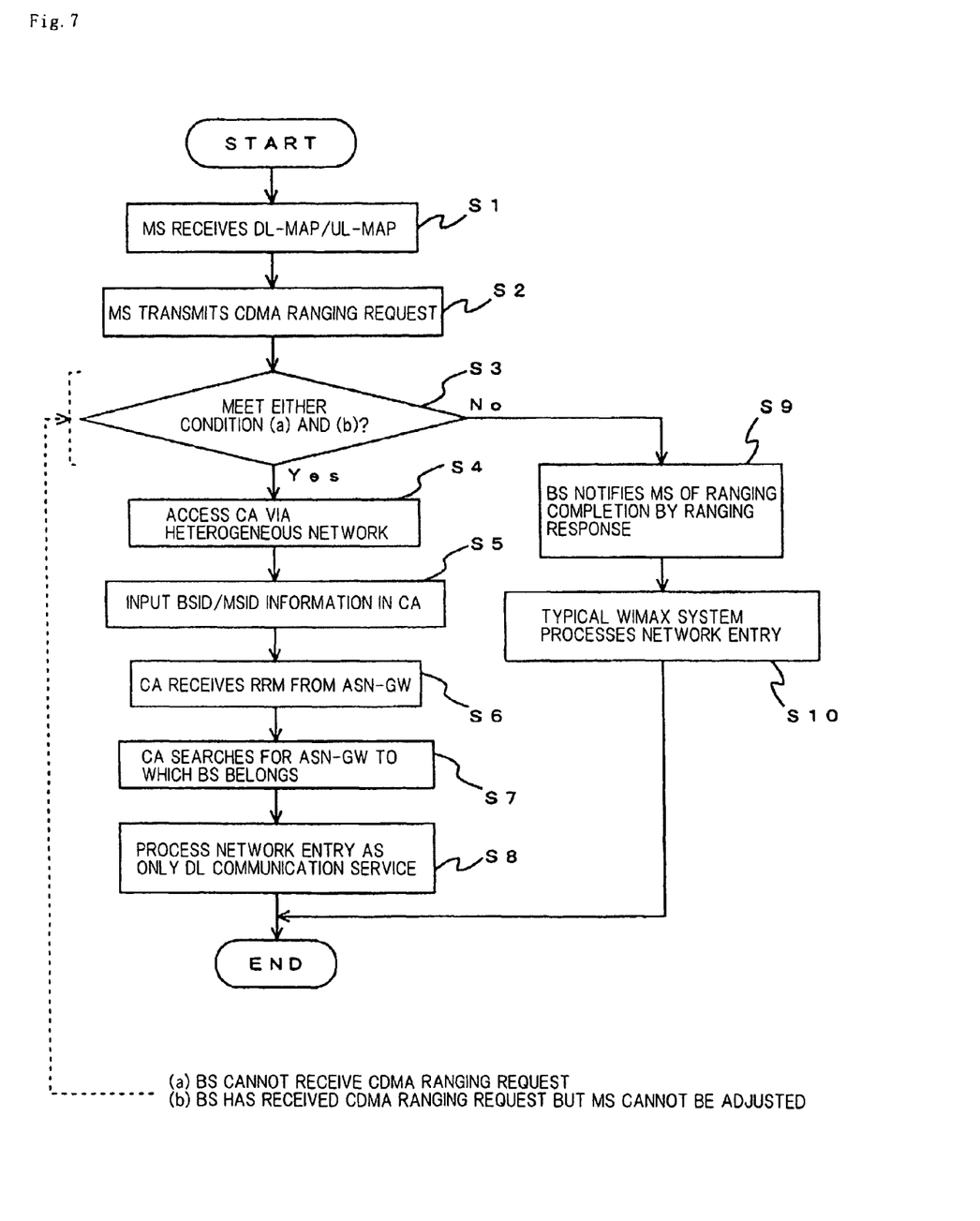
FIG. 7 is a flowchart showing procedures of Network Entry and data path generation if a WiMAX-embedded wireless terminal is in an area where only Down Link service can be provided.

If WiMAX-embedded wireless terminal 4 is in area 2 where only the Down Link service is possible, as shown in FIG. 2, WiMAX-embedded wireless terminal 4 performs Network Entry processing and data path generation processing according to the flow shown in FIG. 7.

WiMAX-embedded wireless terminal 4 is in an environment in which it can receive and demodulate WiMAX OFDMA (Orthogonal Frequency Division Multiple Access) signals transmitted periodically from WiMAX base station 3 by using WiMAX communicator 103 and in which it can decode DL-MAP and UL-MAP. When WiMAX-embedded wireless terminal 4 performs Network Entry, it receives the DL-MAP and UL-MAP from WiMAX base station 3 via the WiMAX network (step S1). When controller 101 of WiMAX-embedded wireless terminal 4 receives the DL-MAP and UL-MAP from WiMAX base station 3, it transmits a CDMA Ranging Request to WiMAX base station 3 using WiMAX communicator 103 (step S2).

If CDMA Ranging is successful (determined No at step S3), controller 201 of WiMAX base station 3 transmits a Ranging Response to WiMAX-embedded wireless terminal 4 using WiMAX communicator 203 to notify WiMAX-embedded wireless terminal 4 of the Ranging completion, as shown in FIG. 1 (step S9). Then, controller 201 of WiMAX wireless base station 3 and controller 101 of WiMAX-embedded wireless terminal 4 perform Network Entry processing (which provides both DL and UL communication services) which has been performed in a general WiMAX system (step S10).

If the CDMA Ranging is not successful, i.e., if either of the following conditions (a) and (b) are met (determined Yes at step S3), controller 101 of WiMAX-embedded wireless terminal 4 uses heterogeneous network communicator 104 to access CA 6 via heterogeneous network 9, as in the sequence shown in FIG. 4 (step S4).

If condition (a) is met, WiMAX base station 3 cannot receive a CDMA Ranging Request and WiMAX base station 3 cannot transmit a Ranging Response due to the problem of distance or delay. If condition (b) is met, WiMAX base station 3, that has received a CDMA Ranging Request, repeatedly transmits a Ranging Response containing adjusted value information to WiMAX-embedded wireless terminal 4 for a prescribed number of times but WiMAX-embedded wireless terminal 4 cannot adjust the value.

Controller 101 of WiMAX-embedded wireless terminal 4 obtains a BSID (base station identifier) of WiMAX base station 3 from DL-MAP. Terminal 4 uses heterogeneous network communicator 104 to transmit information of the BSID and an MSID (mobile station identifier) of wireless terminal 4 itself to CA 6 through heterogeneous network 9 (step S5).

Figure 8:
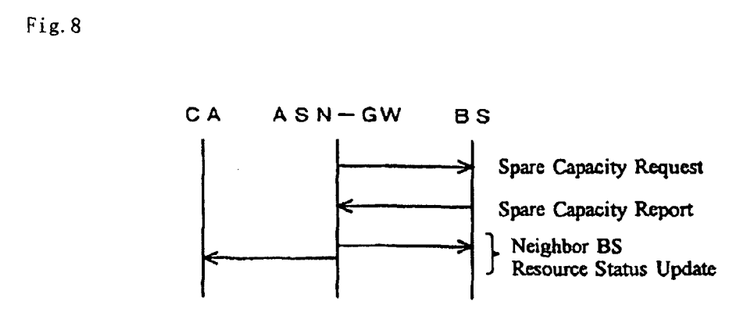
FIG. 8 is a diagram showing a transmission sequence of a Spare Capacity Request, a Spare Capacity Report and a Neighbor BS Resource Status Update.

ASN-GW 5 transmits a Spare Capacity Request to WiMAX base stations 3 in GW 5 for RRM (Ratio Resource Management) at each pre-determined time interval, as shown in FIG. 8. Controller 201 of WiMAX base station 3 that has received the Spare Capacity Request uses network communicator 204 to transmit Spare Capacity Report to ASN-GW 5. Herein, the Spare Capacity Report contains BSID information. Typically, ASN-GW 5 transmits Neighbor BS Resource Status Update containing all information of WiMAX base stations 3 in GW 5 to all WiMAX base stations 3 in GW 5. In the WiMAX system according to this exemplary embodiment, ASN-GW 5 transmits the Neighbor BS Resource Status Update not only to WiMAX base station 3, but also to CA 6(step S6). This operation is different from an existing system.

CA 6 searches for the BSIDs inputted from WiMAX-embedded wireless terminal 4 based on the Neighbor BS Resource Status Update information received from ASN-GW 5, and identifies ASN-GW 5 which manages WiMAX base stations 3 (step S7).

Figure 9:
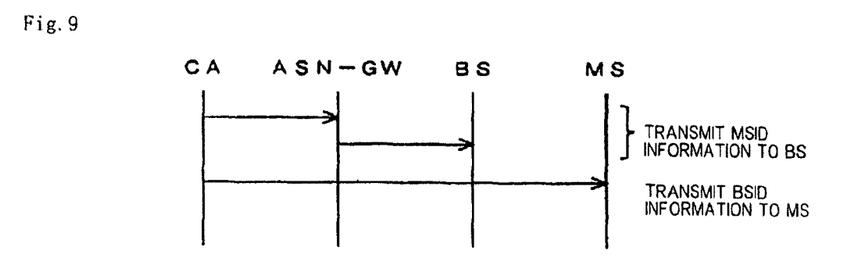
FIG. 9 is a diagram showing a sequence of delivery of a BSID and an MSID from the CA to a WiMAX-embedded wireless terminal and to a WiMAX base station.

As shown in FIG. 9, CA 6 conveys MSID information to WiMAX base station 3 through ASN-GW 5. At the same time, CA 6 notifies WiMAX-embedded wireless terminal 4 that WiMAX base station 3 has been found and negotiation is possible using a WiMAX management message.

Controller 101 of WiMAX-embedded wireless terminal 4 performs negotiation for SS Basic Capability, Registration, Privacy Key Management or data path generation, and establishes a connection to get Down Link service as necessary. Controller 101 also performs negotiation to get MBS (Multicast Broadcast Service) as necessary (step S8).

The WiMAX system according to this exemplary embodiment provides only a Down Link service in an area where the strength of the received power is sufficient for Down Link but the adjusted value of the received power or timing is insufficient for Up Link so that only Down Link communication is possible, thereby expanding a communication area.

Further, an MBS does not assign a Down Link band to each WiMAX-embedded wireless terminal 4 that is connected, but assigns the same Down Link band to all WiMAX-embedded wireless terminals 4 for the service in the area where only Down Link communication is possible, thereby improving band usability.

Although an example has been described in the above in which a device for accessing heterogeneous network 9 is implemented in WiMAX-embedded wireless terminal 4, the present invention is not limited to it. For example, WiMAX-embedded wireless terminal 4 can include an interface unit connected to another apparatus, for example, a PC (Personal Computer) or a PDA (Personal Digital Assistant). In such a configuration, even if WiMAX-embedded wireless terminal 4 is not equipped with multiple devices for accessing heterogeneous network 9, WiMAX-embedded wireless terminal 4 can use the communication function of the other apparatus connected to the interface unit to access CA 6 through heterogeneous network 9 similarly to the case in which terminal 4 is equipped with multiple access devices.

Second Exemplary Embodiment

A second exemplary embodiment of the present invention will be described. The configuration of a WiMAX system is basically similar to that of the first exemplary embodiment.

Figure 10:
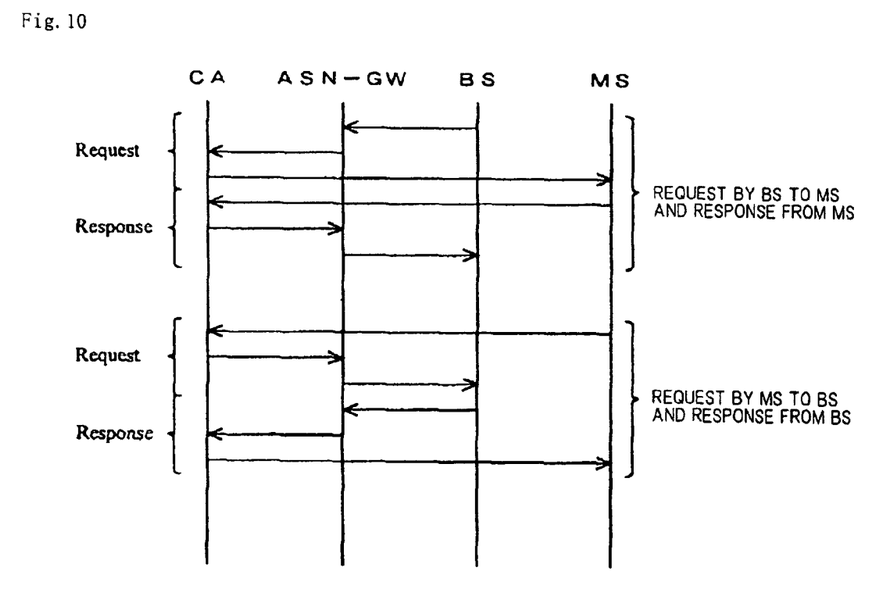
FIG. 10 is a diagram showing a communication sequence if both Down Link and Up Link are made through a heterogeneous network and a CSN.

According to this exemplary embodiment, in an area where the strength of receiving electric field and the value of reception timing in Up Link are insufficient and where the strength of receiving electric field in Down Link is also insufficient, if WiMAX-embedded wireless terminal 4 acknowledges a BSID of WiMAX base station 3, negotiation is performed using a management message for Network Entry other than Ranging. In the negotiation, as shown in FIG. 10, for both of Down Link and Up Link, WiMAX base station 3 and WiMAX-embedded wireless terminal 4 do not directly negotiate with each other, but WiMAX base station 3 and WiMAX-embedded wireless terminal 4 negotiate with each other through heterogeneous network 9 and CA 6 of CSN 8. Controller 101 of WiMAX-embedded wireless terminal 4 can determine whether or not the strength of receiving electric field in Down Link is insufficient in an area based on RSSI (Received Signal Strength Indication). Controller 101 can also determine that the strength of the receiving electric field in Down Link is insufficient when the number of times, at which the intensity of the receiving voltage is below a predetermined threshold, reaches a prescribed value.

For the purpose of acknowledging a BSID, the BSID of an area, where individual live such as a home or a frequently used location where the strength of the received power in Down Link is sufficient, is previously registered.

In an area where the strength of a receiving electric field in Down Link is insufficient, by performing Network Entry in the WiMAX system through heterogeneous network 9 and CA 6 of CSN 8, in addition to Down Link and Up Link, handover from heterogeneous network 9 can be rapidly performed.

Third Exemplary Embodiment

A third exemplary embodiment of the present invention will be described. The configuration of a WiMAX system is similar to that of the first exemplary embodiment.

According to this exemplary embodiment, controller 201 of WiMAX base station 3 assigns the same Down Link band to all WiMAX-embedded wireless terminals 4 in an area where only Down Link communication is possible for the MBS. An MBS includes a Single BS MBS and a Multi BS MBS, to both of which this exemplary embodiment can be applied. A service using the MBS includes a broadcast channel, for example.

To change content such as broadcast content, controller 101 of WiMAX-embedded wireless terminal 4 accesses an application server (not shown) on CSN 8 through heterogeneous network 9 and CSN 8 without using Up Link of the WiMAX system. The application server changes the content depending on a change request by controller 101.

Figure 11:
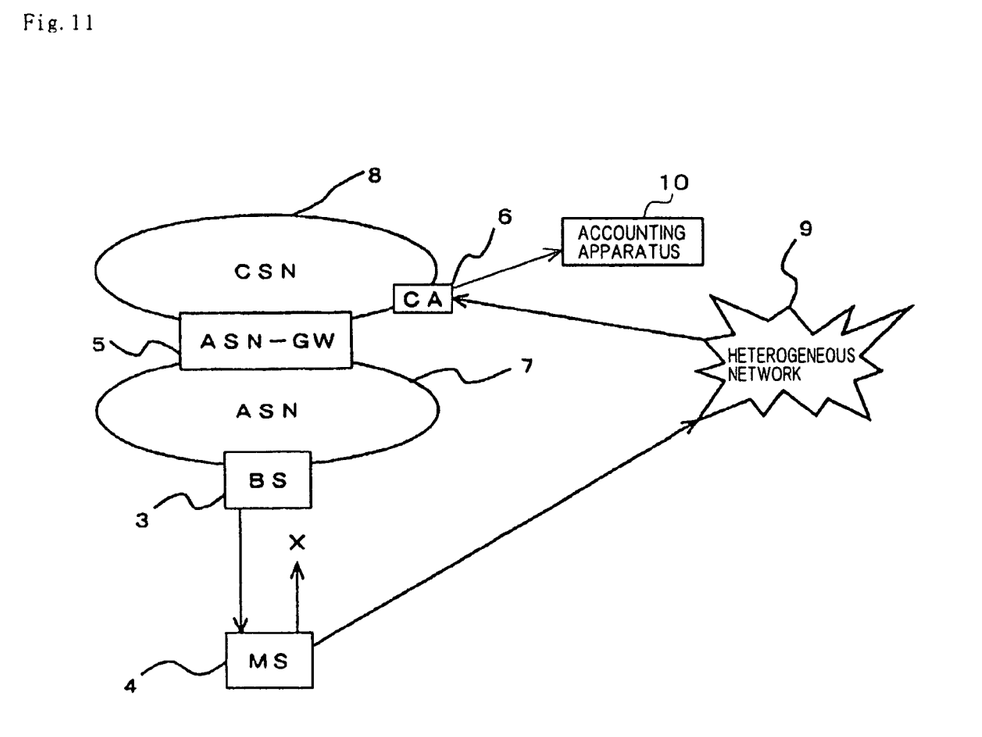
FIG. 11 is a block diagram showing the configuration of a WiMAX system according to another exemplary embodiment of the present invention.

Each exemplary embodiment described in the above is one example of the present invention, but the present invention is not limited to the exemplary embodiments. For example, when WiMAX-embedded wireless terminal 4 performs upstream communication via heterogeneous network 9 in each exemplary embodiment, accounting processing can be performed on WiMAX-embedded wireless terminal 4 based on the record of certification by CA 6. FIG. 11 shows the configuration of a WiMAX system comprising an accounting apparatus for performing such accounting processing.

In the WiMAX system shown in FIG. 11, accounting apparatus 10 is added to the configuration shown in FIG. 3. Accounting apparatus 10 is connected to CA 6 via a network for mutual communication.

CA 6 retains a certification record when WiMAX-embedded wireless terminal 4 performs upstream communication via heterogeneous network 9. CA 6 transmits the retained certification record to accounting apparatus 10 depending on a request by accounting apparatus 10. Accounting apparatus 10 performs accounting processing on WiMAX-embedded wireless terminal 4 based on the certification record supplied from CA 6. In this manner, accounting processing can be performed for upstream communication from WiMAX-embedded wireless terminal 4 to WiMAX base station 3 via heterogeneous network 9.

As the above, various variations of the present invention can be provided.

In each exemplary embodiment, WiMAX-embedded wireless terminal 4 transmits a CDMA Ranging Request as a ranging signal to WiMAX base station 3 to establish communication with WiMAX base station 3. WiMAX base station 3 sends back a response signal (Ranging Response) that includes completion notification if a communication parameter of the ranging signal is within a pre-determined range, or that includes adjusted value information if the parameter is not within the pre-determined range to WiMAX-embedded wireless terminal 4 via the WiMAX network. A communication parameter herein includes at least one of the following parameters of a response signal: power, timing or frequency.

The invention is not limited to a WiMAX system. The invention may be applied to general wireless communication systems represented by a mobile system, a PHS system, a wireless LAN (for example, Wi-Fi) or the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the claims.

What is claimed is:

1. A wireless communication system comprising at least one wireless terminal and one wireless base station, said wireless terminal being connected to said wireless base station via a wireless network and a heterogeneous network which is an arbitrary communication network different from said wireless network, wherein said wireless terminal includes:

a first wireless communicator that sends out a ranging signal to said wireless base station via said wireless network to establish communication with said wireless base station; and a parameter adjuster that adjusts a communication parameter of said ranging signal depending on adjusted value information contained in a response signal received from said wireless base station via said wireless network, said wireless base station includes:

a parameter determiner that determines whether or not the communication parameter of said ranging signal received from said wireless terminal via said wireless network is within a pre-determined range; and a second wireless communicator that sends back said response signal that includes completion notification if the communication parameter of said ranging signal is within the pre-determined range, or that includes said adjusted value information if the parameter is not within the pre-determined range, to said wireless terminal via said wireless network, and if said wireless base station cannot receive said ranging signal from said wireless terminal or if the adjustment is not completed even after said wireless terminal adjusts said communication parameter depending on said adjusted value information for a pre-determined number of times, negotiation is performed via said heterogeneous network to establish a communication connection for upstream communication from said wireless terminal to said wireless base station, and only downstream communication from said wireless base station to said wireless terminal is performed via said wireless network.

2. The wireless communication system according to claim 1, further comprising:
a certificate authority that certificates said wireless terminal for accessing said wireless base station via said heterogeneous network; and
a gateway that connects between a first network, in which said certificate authority is installed, and a second network, in which said wireless base station is installed, and that manages said wireless base station,
wherein said gateway delivers information, that is contained in said wireless base station and that is to be managed, to all of said wireless base stations that are to be managed and to said certificate authority at pre-determined intervals.

3. The wireless communication system according to claim 1, wherein said communication parameter includes at least one parameter among power, timing and frequency of said response signal.

4. The wireless communication system according to claim 1, wherein said wireless base station performs negotiation to establish a communication connection for downstream communication with said wireless terminal via said heterogeneous network.

5. The wireless communication system according to claim 1, wherein said wireless base station assigns the same band to all of said wireless terminals for downstream communication via said wireless network.

6. The wireless communication system according to claim 1 further comprising an accounting apparatus that performs accounting processing for upstream communication from said wireless terminal to said wireless base station via said heterogeneous network based on a result of certification by said certificate authority.

7. A wireless communication system comprising at least one wireless terminal and one wireless base station, said wireless terminal being connected to said wireless base station via a wireless network and a heterogeneous network which is an arbitrary communication network different from said wireless network, wherein
said wireless terminal includes:
an interface unit that communicates with said wireless base station via said heterogeneous network using a communication function of another apparatus that is connected;
a first wireless communicator that sends out a ranging signal to said wireless base station via said wireless network to establish communication with said wireless base station; and
a parameter adjuster that adjusts a communication parameter of said ranging signal depending on adjusted value information contained in a response signal received from said wireless base station via said wireless network,
said wireless base station includes:
a network communicator that communicates with said wireless terminal via said heterogeneous network;
a parameter determiner that determines whether or not the communication parameter of said ranging signal received from said wireless terminal via said wireless network is within a pre-determined range; and
a second wireless communicator that sends back said response signal that includes completion notification if the communication parameter of said ranging signal is within the pre-determined range, or that includes said adjusted value information if the parameter is not within the pre-determined range, to said wireless terminal via said wireless network, and
if said wireless base station cannot receive said ranging signal from said wireless terminal or if the adjustment is not completed even after said wireless base station adjusts said communication parameter depending on said adjusted value information for a pre-determined number of times, negotiation is performed using a communication function of said another apparatus via said heterogeneous network to establish a communication connection for upstream communication from said wireless terminal to said wireless base station, and only downstream communication from said wireless base station to said wireless terminal is performed via said wireless network.

8. The wireless communication system according to claim 7, further comprising:
a certificate authority that certificates said wireless terminal for accessing said wireless base station via said heterogeneous network; and
a gateway that connects between a first network, in which said certificate authority is installed, and a second network, in which said wireless base station is installed, and that manages said wireless base station,
wherein said gateway delivers information, that is contained in said wireless base station and that is to be managed, to all of said wireless base stations that are to be managed and to said certificate authority at pre-determined intervals.

9. The wireless communication system according to claim 7, wherein said communication parameter includes at least one parameter among power, timing and frequency of said response signal.

10. The wireless communication system according to claim 7, wherein said wireless base station performs negotiation to establish a communication connection for downstream communication with said wireless terminal via said heterogeneous network.

11. The wireless communication system according to claim 7, wherein said wireless base station assigns the same band to all of said wireless terminals for downstream communication via said wireless network.

12. The wireless communication system according to claim 7 further comprising an accounting apparatus that performs accounting processing for upstream communication from said wireless terminal to said wireless base station via said heterogeneous network based on a result of certification by said certificate authority.

13. The wireless communication system according to claim 1, wherein said wireless communication system is a WiMAX system and said wireless network is a WiMAX network.

14. The wireless communication system according to claim 1, wherein said first wireless communicator is a first WiMAX communicator and said second wireless communicator is a second WiMAX communicator.

15. A wireless terminal which is connected to a wireless base station via a wireless network and a heterogeneous network which is an arbitrary communication network different from the wireless network, said wireless terminal comprising:

a wireless communicator that sends out a ranging signal to said wireless base station via said wireless network to establish communication with said wireless base station;

a parameter adjuster that adjusts a communication parameter of said ranging signal depending on adjusted value information contained in a response signal received from said wireless base station via said wireless network; and a controller that performs negotiation to establish a communication connection for upstream communication with said wireless base station via said heterogeneous network and that performs only downstream communication from said wireless base station via said wireless network, if the adjustment is not completed even after said parameter is adjusted for a pre-determined number of times depending on said adjusted value information, or if said wireless base station cannot receive said ranging signal.

16. The wireless terminal according to claim 15, wherein said communication parameter includes at least one parameter from among power, timing and frequency of said response signal.

17. The wireless terminal according to claim 15, wherein said wireless network is a WiMAX network and said wireless communicator is a WiMAX communicator.

18. A wireless base station which is connected to at least one wireless terminal via a wireless network and via a heterogeneous network which is an arbitrary communication network different from the wireless network, said wireless base station comprising:

a parameter determiner that determines whether or not a communication parameter of a ranging signal received from said wireless terminal via said wireless network is within a pre-determined range;

a wireless communicator that sends back a response signal that includes completion notification if the communication parameter of said ranging signal is within the pre-determined range, or that includes adjusted value information if the parameter is not within the pre-determined range, to said wireless terminal via said wireless network; and a controller that performs negotiation via said heterogeneous network to establish a communication connection for upstream communication from said wireless terminal and that performs only downstream communication to said wireless terminal via said wireless network, if said wireless base station cannot receive said ranging signal from said wireless terminal, or if the adjustment is not completed even after said wireless terminal adjusts said parameter depending on said adjusted value information for a pre-determined number of times.

19. The wireless base station according to claim 18, further comprising a network communicator that performs negotiation, via said heterogeneous network, to establish communication connection for downstream communication with said wireless terminal.

20. The wireless base station according to claim 18, wherein said controller assigns the same band to all of said wireless terminals for downstream communication via said wireless network.

21. The wireless base station according to claim 18, wherein said wireless network is a WiMAX network and said wireless communicator is a WiMAX communicator.

22. A wireless communication method performed in a wireless terminal which is connected to a wireless base station via a wireless network and a heterogeneous network which is an arbitrary communication network different from the wireless network, said wireless communication method comprising:

transmitting a ranging signal to said wireless base station via said wireless network to establish communication with said wireless base station;

adjusting a communication parameter of said ranging signal depending on adjusted value information contained in a response signal received from said wireless base station via said wireless network; and performing negotiation to establish a communication connection for upstream communication with said wireless base station via said heterogeneous network and that performs only downstream communication from said wireless base station via said wireless network, if the adjustment is not completed even after said parameter is adjusted for a pre-determined number of times depending on said adjusted value information, or if said wireless base station cannot receive said ranging signal.

23. The wireless communication method according to claim 22, wherein said wireless network is a WiMAX network.

24. A wireless communication method performed in a wireless base station which is connected to at least one wireless terminal via a wireless network and via a heterogeneous network which is an arbitrary communication network different from the wireless network, said wireless communication method comprising:

determining whether or not a communication parameter of a ranging signal received from said wireless terminal via said wireless network is within a pre-determined range;

transmitting a response signal that includes completion notification if the communication parameter of said ranging signal is within the pre-determined range, or that includes adjusted value information if the parameter is not within the pre-determined range, to said wireless terminal via said wireless network; and performing negotiation via said heterogeneous network to establish a communication connection for upstream communication from said wireless terminal and that performs only downstream communication to said wireless terminal via said wireless network, if said wireless base station cannot receive said ranging signal from said wireless terminal, or if the adjustment is not completed even after said wireless terminal adjusts said parameter depending on said adjusted value information for a pre-determined number of times.

25. The wireless communication method according to claim 24, wherein said wireless network is a WiMAX network.

* * * * *